United States Patent
Conley et al.

(10) Patent No.: US 10,949,454 B2
(45) Date of Patent: Mar. 16, 2021

(54) UNSUPERVISED TECHNIQUE FOR TRAINING AN ENGAGEMENT CLASSIFIER IN CHAT-BASED GROUP CONVERSATION

(71) Applicant: International Business Machines Corporation, Armonk, NY (US)

(72) Inventors: Devin A. Conley, Austin, TX (US); Lakshminarayanan Krishnamurthy, Round Rock, TX (US); Sridhar Sudarsan, Austin, TX (US); Priscilla Santos Moraes, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 16/167,248

(22) Filed: Oct. 22, 2018

(65) Prior Publication Data
US 2020/0125678 A1    Apr. 23, 2020

(51) Int. Cl.
*G06F 16/35*    (2019.01)
*H04L 12/58*    (2006.01)
*G06N 5/02*    (2006.01)
*G06K 9/62*    (2006.01)

(52) U.S. Cl.
CPC .......... *G06F 16/35* (2019.01); *G06K 9/6247* (2013.01); *G06N 5/02* (2013.01); *H04L 51/02* (2013.01)

(58) Field of Classification Search
CPC ........ G06K 9/6247; G06N 5/02; H04L 51/02; G06F 16/35; G06F 17/30705
See application file for complete search history.

(56) References Cited

U.S. PATENT DOCUMENTS

| | | | |
|---|---|---|---|
| 10,498,898 B2* | 12/2019 | Mazza | G10L 15/16 |
| 2008/0046394 A1 | 2/2008 | Zhou et al. | |
| 2011/0078105 A1 | 3/2011 | Wallace | |
| 2012/0041903 A1 | 2/2012 | Beilby et al. | |
| 2012/0059896 A1* | 3/2012 | Li | H04L 51/04 |
| | | | 709/206 |

(Continued)

OTHER PUBLICATIONS

Liu et al (2018, "Content-Oriented User Modeling or Personalized Response Ranking in Chatbots," IEEE/ACM Transactions on Audio, Speech, and Language Processing, v.26, No. 1, pp. 122-133) (Year: 2018).*

(Continued)

*Primary Examiner* — Angela A Armstrong
(74) *Attorney, Agent, or Firm* — Diana R. Gerhardt; Jack V. Musgrove

(57) ABSTRACT

An engagement classifier for a group chatbot is trained by leveraging the implicit dataset generated by humans engaging in both direct messages as well as group conversations. Human-to-human direct messages are used as an approximate representation of the domain knowledge and expertise of each user. The decision to engage in a group conversation is assumed to be based on that domain knowledge. The knowledge representations and instances of engagements in group conversations yields an effective set of features and labels which can be used to model the engagement decision. The same transfer learning technique is used to generate a knowledge representation for the group chatbot. Given this representation of the domain knowledge of the chatbot, the classifier can predict whether it should engage in any particular group conversation.

14 Claims, 6 Drawing Sheets

(56) References Cited

U.S. PATENT DOCUMENTS

| | | |
|---|---|---|
| 2016/0308795 A1 | 10/2016 | Cheng et al. |
| 2018/0025726 A1 | 1/2018 | Gatti de Bayser et al. |
| 2018/0032533 A1* | 2/2018 | Singh ..................... G06F 40/35 |
| 2018/0131645 A1* | 5/2018 | Magliozzi ............... G06F 40/30 |
| 2019/0325029 A1* | 10/2019 | Gandhi ................... G06F 40/20 |
| 2019/0325034 A1* | 10/2019 | Morrison .......... G06F 16/24578 |
| 2020/0074475 A1* | 3/2020 | Zabrzenski ............. H04L 51/02 |

OTHER PUBLICATIONS

Gatti de Bayser, Maira, et al., "A Hybrid Conceptual Architecture for MultiParty Chat Group", Proc. Int'l. Conf. on Intelligent Virtual Agents (2017).

IBM, "Watson Assistant Getting started tutorial" [online], retrieved on Sep. 5, 2018, from the Internet URL: https://console.bluemix.net/docs/services/conversation/getting-started.html (2018).

IBM, "Watson Assistant Tutorial: Building a complex dialog" [online], retrieved on Oct. 22, 2018, from the Internet URL: https://console.bluemix.net/docs/services/conversation/tutorial.html#tutorial (2018).

Li, Chaozhuo, et al., "Detecting Context Dependent Messages in a Conversational Environment", Proc. Int'l. Conf. on Computational Linguistics, pp. 1990-1999 (2016).

Liu, Bingquan, et al., "Content-Oriented User Modeling for Personalized Response Ranking in Chatbots", IEEE/ACM Transactions on Audio, Speech, and Language Processing, v. 26, n. 1, pp. 122-133 (2018).

Serban, Iulian, et al., "Deep Reinforcement Learning Chatbot", Cornell University Library arXiv 1709.02349 (2017).

Uthus, David et al., "Multiparticipant chat analysis: A survey", J. Artificial Intelligence, v. 199-200, n. 1, pp. 106-121 (2013).

* cited by examiner

… (1)

UNSUPERVISED TECHNIQUE FOR TRAINING AN ENGAGEMENT CLASSIFIER IN CHAT-BASED GROUP CONVERSATION

BACKGROUND OF THE INVENTION

Field of the Invention

The present invention generally relates to group messaging, and more particularly to a method of using a chatbot in a group conversation.

Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user.

NLP is often used in conjunction with cognitive systems. A cognitive system (sometimes referred to as deep learning, deep thought, or deep question answering) is a form of artificial intelligence that uses machine learning and problem solving. A modern implementation of artificial intelligence is the IBM Watson™ cognitive technology, which applies advanced NLP, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

Natural language classifiers are commonly used in NLP systems to identify the type of discourse in connected text, e.g., a yes/no question, a content question, a statement, an assertion, etc. This service enables developers without a background in machine learning or statistical algorithms to create natural language interfaces for their applications. A natural language classifier (NLC) interprets the intent behind text and returns a corresponding classification with associated confidence levels. The return value can then be used to trigger a corresponding action, such as redirecting the request or answering a question. NLCs are typically tuned and tailored to short text (1000 characters or less) and can be trained to function in any domain or application. For example, the IBM Watson™ natural language classifier service applies deep learning techniques to make predictions about the best predefined classes for short sentences or phrases. Exemplary applications include responding to questions from users that would otherwise be handled by a live (human) agent, categorizing text messages (SMS) as personal, work, or promotional, classifying tweets into a sets such as events, news, or opinions, and analyzing text from social media or other sources to determine whether it relates positively or negatively to an offering or service.

One application of NLP and cognitive systems is a chatbot, that is, a computer program designed to simulate conversation with human users. Chatbots have become ubiquitous on the Internet. For example, a consumer may be shopping online or seeking help with a product problem using a website which provides a chat portal or interface allowing the consumer to type in the request/problem. The chatbot can use NLP techniques along with a corpus of reference knowledge to provide an answer or suggestion. Oftentimes the consumer may believe they are talking with a human at the company when actually the chatbot is completely automated. Businesses prize chatbots as they reduce the necessity of having live agents available twenty-four hours a day, seven days a week.

One area which has created a challenge for chatbot design is group (multiparticipant) chat. As discussed in the article "Multiparticipant chat analysis: A survey" by Uthus and Aha, group chat has a wide variety of uses including recreation, business, software development, online courses, collaborative learning, gaming and technical support. Chatbots can be used in this setting, e.g., to answering commonly asked questions in a support channel, trigger simple business processes, perform as a facilitator, refer a user to outside resources, etc. For many reasons, group chat is much more difficult to analyze than direct (one-to-one) messaging. As further noted in the paper "A Hybrid Conceptual Architecture for MultiParty Chat Group" by Gatti de Bayser et al., current existing chatbot engines do not properly handle a group chat with many users and many chatbots. In particular chatbots appear considerably less social, which is a problem since there is a strong demand of having social chatbots that are able to provide different kinds of services, from traveling packages to finance advisors in a open chat.

SUMMARY OF THE INVENTION

The present invention in at least one embodiment is generally directed to a method of enabling an engagement classifier for a group chatbot by receiving a plurality of direct message conversations for respective users, obtaining from each direct message conversation a collection of terms per user, creating a knowledge representation for the users based on the collections of terms, monitoring group messages to identify instances of user engagements, and training the engagement classifier by correlating the knowledge representations with the instances of user engagements. The user knowledge representation can be created in various ways, such as by modeling the terms as sparse vectors in a vocabulary space and applying principal component analysis to the sparse vectors resulting in a dense vector corresponding to the knowledge representation. Alternatively, the user knowledge representation can be created by modeling the users as documents and applying latent Dirichlet allocation to the documents resulting in a topic distribution corresponding to the knowledge representation. The engagement classifier can likewise be trained according to different approaches, such as using a long short-term memory network which maintains a state of a group conversation based on the group messages. Alternatively, the engagement classifier can be trained using cosine similarity measurements between a first vector representing a conversation history of the group messages and a second vector representing the knowledge representation. To further enable the group chatbot, a separate knowledge representation can be created based on another collection of terms derived from simulated conversations of the group chatbot. The knowledge representation for the users and the knowledge representation for the group chatbot are preferably created using the same knowledge embedding technique. Then, as real-time group chat is received (different from the group training messages), the knowledge representation for the group chatbot is used with the engagement classifier to make a decision to engage in the group chat. When that decision is positive, the group chatbot can responsively engage in the group conversation.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Training a chatbot model on proper etiquette for engaging in a group conversation is an inherently complex task. The chat data is unstructured text, can be among many participants, and is heavily dependent on context. Further, even the decision to engage is extremely subjective and will differ between participants based on personality, experience, etc. Due to all of these complications it is very difficult to generate a ground truth dataset to be used for training an engagement classifier. In the article by Uthus and Aha mentioned in the Background, the only section on chatbots is actually an acknowledgement that the area is underexplored.

It would, therefore, be desirable to devise a method of determining how a chatbot should make the initial decision of whether or not to even engage in group conversation. It would be further advantageous if the method could leverage the implicit dataset generated by humans engaging in both directs messages as well as group conversations. The present invention achieves these and other advantages by building knowledge representations for human users and using these knowledge representations to construct ground truths for an engagement classifier. In a human-to-human direct message, the parties are always expected to respond. Therefore, this data can be used as an approximate representation of the domain knowledge and expertise of each user. The present invention then assumes that the decision to engage in a group conversation is based on that domain knowledge.

This approach yields an effective set of features and labels curated from a human-to-human corpus of both direct messages and group chats. Various techniques can be applied here for modeling this decision. For this model to be useful, the same approach is used to generate knowledge representations for chat-based agents or bots. To accomplish this, the present invention can run the agent against the same corpus of direct message conversations from earlier. Given this representation of the domain knowledge of the bot, the invention can predict whether it should engage in a group chat. The invention thereby provides a significant improvement in the field of natural language processing, i.e., conversational NLP.

Figure 1:
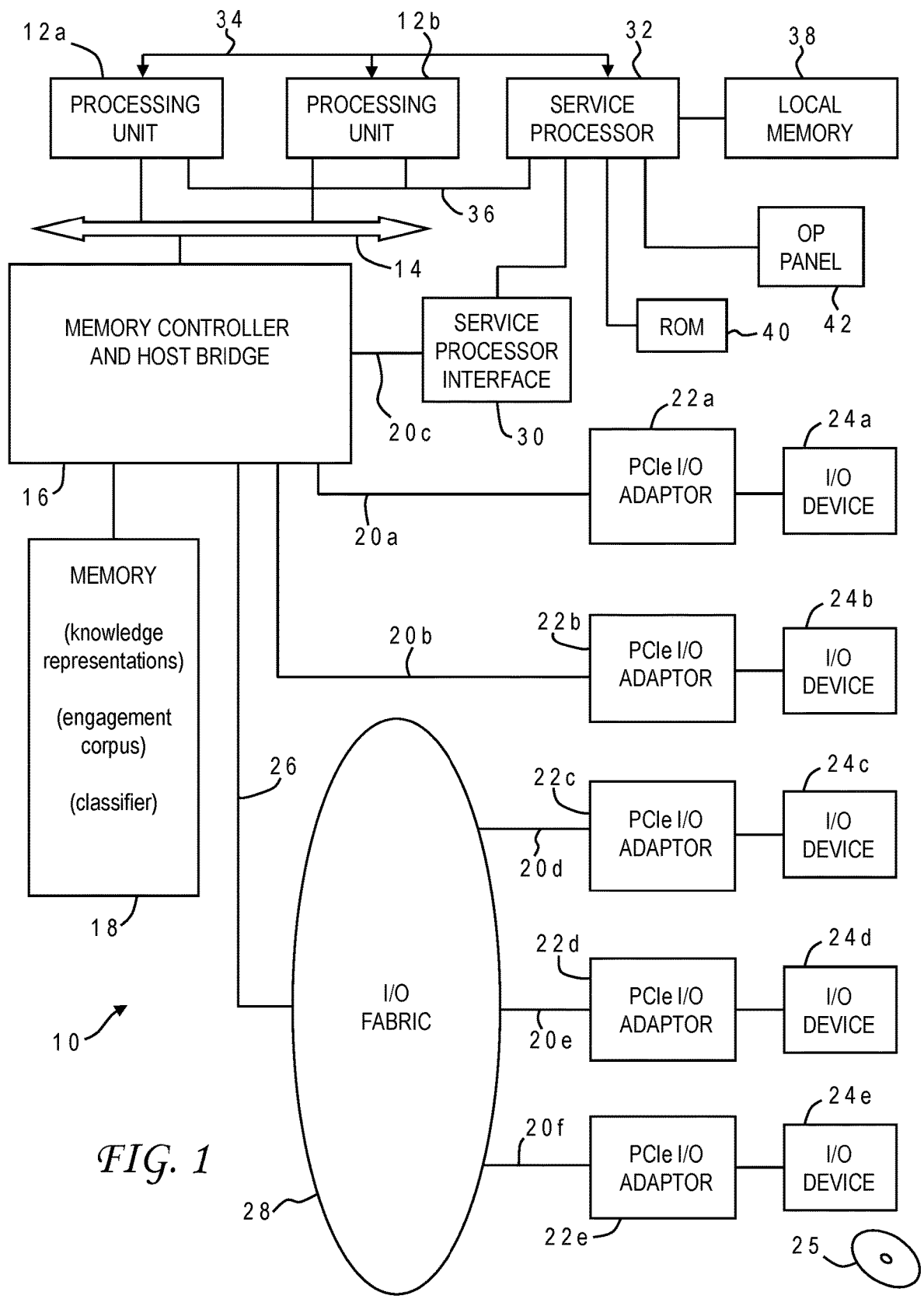
FIG. 1 is a computer system programmed to carry out group chatbot engagement decisions in accordance with one implementation of the present invention.

With reference now to the figures, and in particular with reference to FIG. 1, there is depicted one embodiment 10 of a computer system in which the present invention may be implemented to carry out the knowledge embedding which leads to a practical engagement classifier. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications or modules in accordance with the present invention, including knowledge representations for both human users and chatbots, an engagement corpus, and an engagement classifier.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the engagement classifier of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a chatbot engagement classifier that uses novel transfer learning techniques to build the classifier ground truth and apply the classifier to human-computer interaction. Accordingly, a program embodying the invention may additionally include conventional aspects of various natural language processing and classifier tools, and these details will become apparent to those skilled in the art upon reference to this disclosure.

Figure 2:
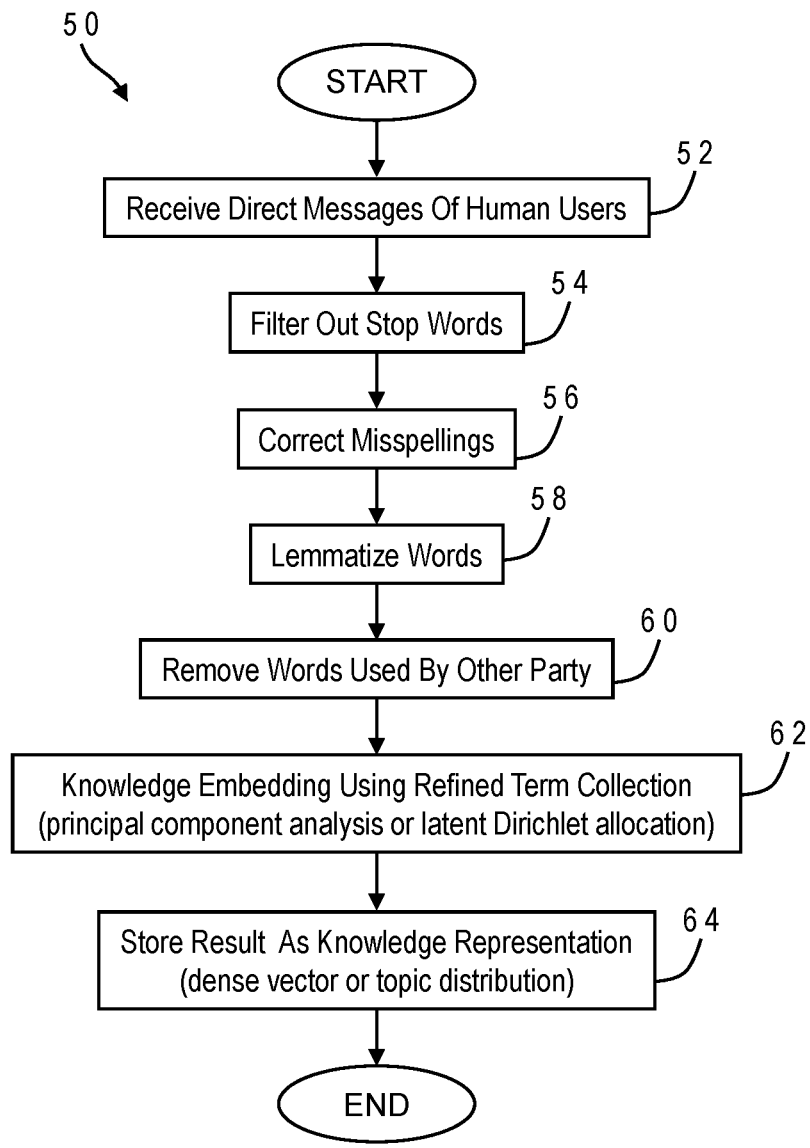
FIG. 2 is a chart illustrating the logical flow for a process of collecting words from direct messaging between human users (chat) in accordance with one implementation of the present invention.

The knowledge embedding for human users relies on a collection of terms ("bag of words") employed by users during direct (i.e., one-to-one) messaging. One process 50 for aggregating the bag of words is seen in FIG. 2 in accordance with an exemplary implementation. The process begins by receiving direct messages between a subject human user and a recipient (opposite) human user (52). This step may be performed in real-time by monitoring direct user chat or may be applied to previously curated chat transcripts. The bag of words thus starts with all of the words used by the subject user. Various filters and techniques are preferably applied to clean up this initial aggregation. This may include filtering out "stop words", i.e., removing them from the collection (54). Some examples of stop words are "the", "a", "but", "if", "because", "then", "at", "by", "for", etc., basically any word that adds little or no meaning (content) to the current topic. The remaining words are checked for any misspellings and corrected where necessary (56). Words are also lemmatized, that is, reduced to a common form or base (58). For example, the words "writing", "wrote", etc., can be reduced to the common word "write". The collection is further reviewed to see if there are any terms that were originally introduced into the conversation by another party, i.e., the opposite user, and such terms are removed (60). This filter serves to reduce the chance of improperly including vocabulary for the subject user when that usage was more of an echo, for example, when the subject user states "I don't know the answer to X". In some implementations words may additionally be concatenated, e.g., "United" followed by "States" becomes "United States", so "term" as used herein may refer to a single word or to a multiple word phrase. Advanced implementations may further decipher certain words as used in the chat text (such as by cognitive assessment) to determine their meaning, e.g., the word "us" in an informal chat setting might be intended as the abbreviation "U.S." which would accordingly be lemmatized as "United States".

Given this sanitized bag of words, there are many ways to achieve a meaningful knowledge embedding (62). Two illustrative methods include principal component analysis and latent Dirichlet allocation, but other methods may be used as well. For principal component analysis (PCA), the set of all users' bags of words can be modeled as sparse vectors in a vocabulary space (a sparse vector is one whose components are mostly 0's, so in this case the vector has an index for every word considered in the vocabulary, most of which have likely not been used by an individual user). Common sizes for a vocabulary range from hundreds to thousands of words, depending on corpus size. PCA is a statistical procedure that uses an orthogonal transformation to convert a set of observations of possibly correlated variables (here, the sparse vectors) into a set of values of linearly uncorrelated variables called principal components. PCA can thus be used to project these vectors onto a more compact, lower-dimensional space. The resulting dense vector would correspond fairly closely with various areas of domain expertise. For latent Dirichlet allocation (LDA), each user is considered to be a document. In natural language processing, LDA is a generative statistical model that allows sets of observations to be explained by unobserved groups that explain why some parts of the data are similar. For example, if observations are words collected into documents, LDA posits that each document is a mixture of a small number of topics and that each word's presence is attributable to one of the document's topics. The topic distribution resulting from LDA as applied to the documents (here, the user chat) becomes a representation of their domain knowledge. The result (from PCA or LDA) can then be stored as the user knowledge representation (64).

Figure 3A:
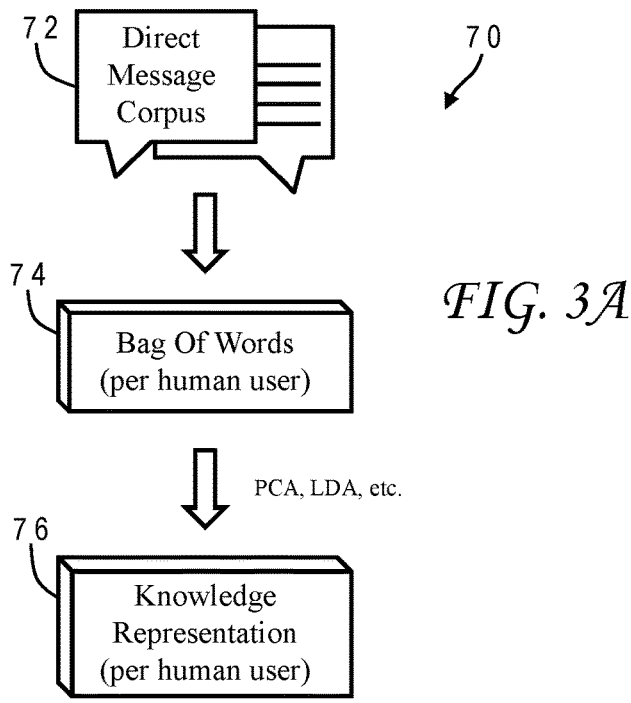
FIGS. 3A-3D are pictorial representations of knowledge embedding for human users and chatbots to derive an engagement classifier used to make a chatbot engagement decision in accordance with one implementation of the present invention.
Figure 3B:
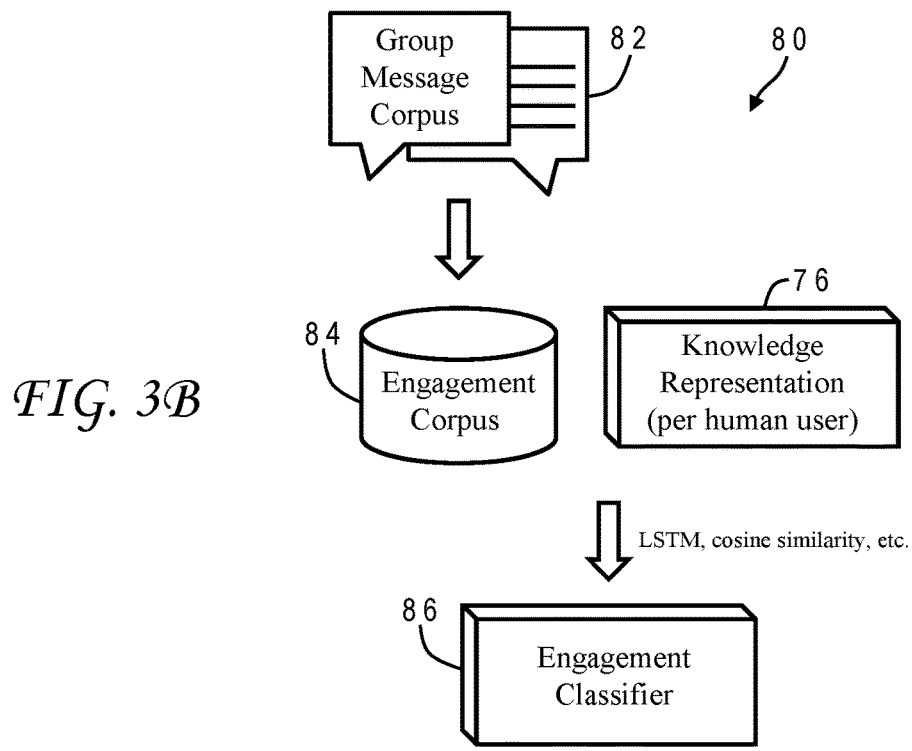

FIGS. 3A-3D are pictorial representations for an illustrative implementation of the overall invention. FIG. 3A shows the user knowledge embedding as just detailed in regard to FIG. 2. A direct message corpus 72 which contains extensive passages of direct human chat is used as the basis to construct the bag of words 74. Bag of words 74 is in turn used as the basis to construct the user knowledge representation 76. In FIG. 3B, a group message corpus 82 is used as the basis to construct an engagement corpus 84, based on each time a particular user joins an existing group conversation (chat topic). Different observations can allow the system to know when a user has engaged in group chat. For example, the chat service may provide read/unread message information so the system can discern between missed messages and a true non-response. The invention may also leverage existing, passively-generated information such as chat data or metadata including things like message timestamps, parent messages, designated replies, etc. Given a particular user's knowledge representation 76, and the conversation history (when that user made the engagement decisions from engagement corpus 84), the present invention effectively provides a fully labeled dataset for engagement. This dataset (the engagement data combined with the knowledge representation) then becomes ground truth for an engagement classifier 86, i.e., engagement classifier 86 is trained using the dataset.

There are a large number of approaches the invention could take to model the engagement decision within engagement classifier 86. Two illustrative methods include long short-term memory and cosine similarity, but other techniques may be used as well. A long short-term memory (LSTM) network is a kind of recurrent neural network. Cells in an LSTM network remember values over arbitrary time intervals and their gates regulate the flow of information into and out of the cell. For purposes of the present invention, an LSTM network can be used to pass messages through to maintain the "state" of a conversation, then outputting a binary (yes/no) decision on whether to respond, given the users knowledge embedding. Cosine similarity is a measure of similarity between two vectors of an inner product space that measures the cosine of the angle between them. In this case, the vectors measured by the cosine similarity represent the conversation history and the knowledge embedding of the participant. Sufficiently small measurements (relative to the sample) represent a positive decision to engage.

Figure 3C:
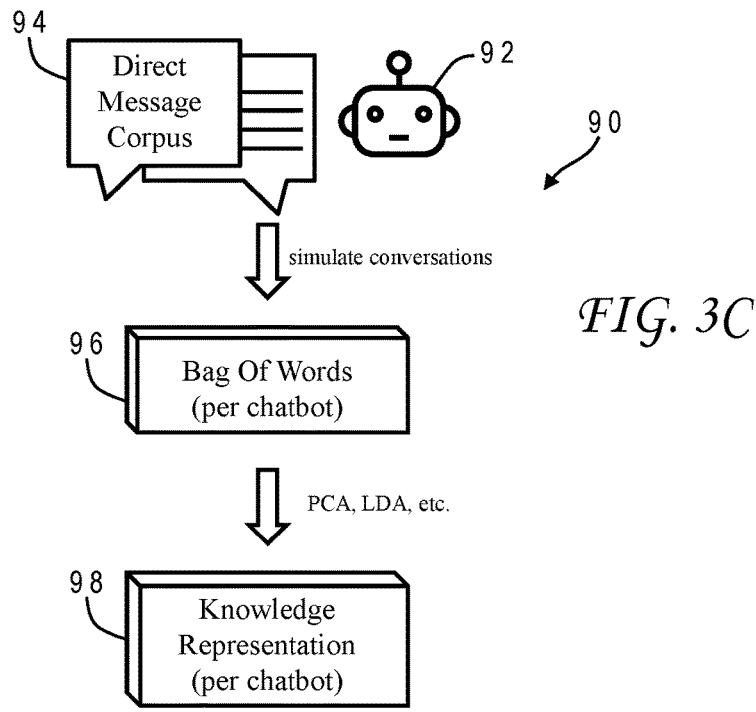

The foregoing model for knowledge embedding can be repurposed to generate a knowledge representation for a chatbot as seen in FIG. 3C. First, a direct message corpus 94 is used to simulate direct conversation with the chatbot 92. Direct message corpus 94 is preferably the same as direct message corpus 72 for generating the user knowledge representation to ensure that the users and bots are being prompted on the same topics/questions. The more important point is that the knowledge embeddings for the users and chatbots are created with the same technique to allow transfer learning (via the engagement classifier) to be effective. Conventional simulation techniques can be used to generate the chatbot chat. A basic approach might be, given each human-to-human direct messaging conversation, strip out one of the human's messages, feed the remaining messages from the other user sequentially through the bot, and record all responses as its corpus of sent messages. The chatbot chat is then used as the basis to generate a bag of words 96 for the chatbot, in a manner similar to that described above in conjunction with FIG. 2 for a user bag of words. Using the same approach described above (e.g., PCA or LDA), a knowledge representation 98 is then built for the chatbot.

Figure 3D:
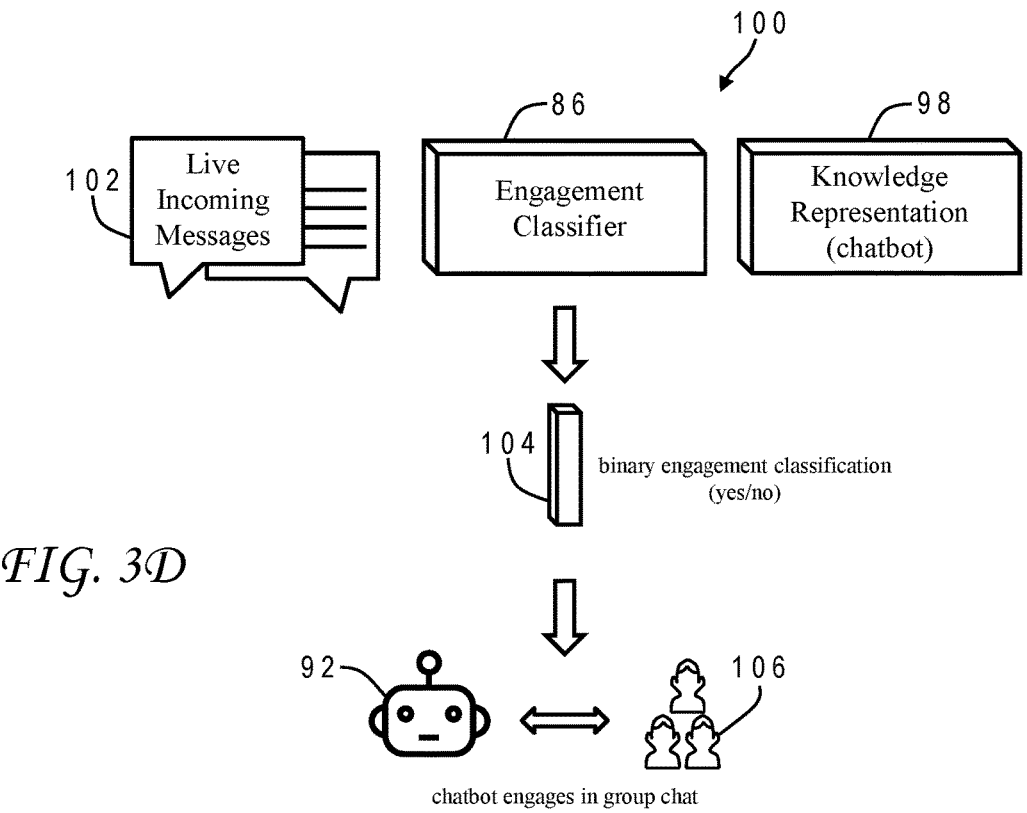

Given this knowledge embedding, the invention can now repurpose engagement classifier 86 as trained above for deciding when to engage in a group chat in real time as depicted in FIG. 3D. The computer system running the chatbot receives a series of live incoming messages 102. Engagement classifier 86 takes these messages and uses the chatbot knowledge representation 98 to make the binary engagement decision 104, i.e., a yes/no decision as to whether to jump into the group chat. For those situations wherein the decision is a yes, chatbot 92 proceeds to engage in conversation with the group 106.

The invention also contemplates some implementations wherein continuous learning is enabled based on engagement feedback from other participants in the channel. For example, if the automated agent is called out somehow in the conversation, e.g., using an identifier such as the "@" symbol combined with a name for the chatbot ("@mentioned"), it can be assumed that the chatbot missed an engagement opportunity, and that missed engagement can subsequently be included as a further training sample.

The engagement classifier of the present invention is just about making the yes/no decision on whether to engage in conversation, and not the content of what the chatbot then says. Of course, it is actually required that the chatbot be trained ahead of time for the content of a response. Conventional means may be employed to actually engage in the group chat. See for example the discussions regarding the Watson™ Assistant at URLs https://console.bluemix.net/docs/services/conversation/getting-started.html and https://console.bluemix.net/docs/services/conversation/tutorial.html #tutorial.

Figure 4:
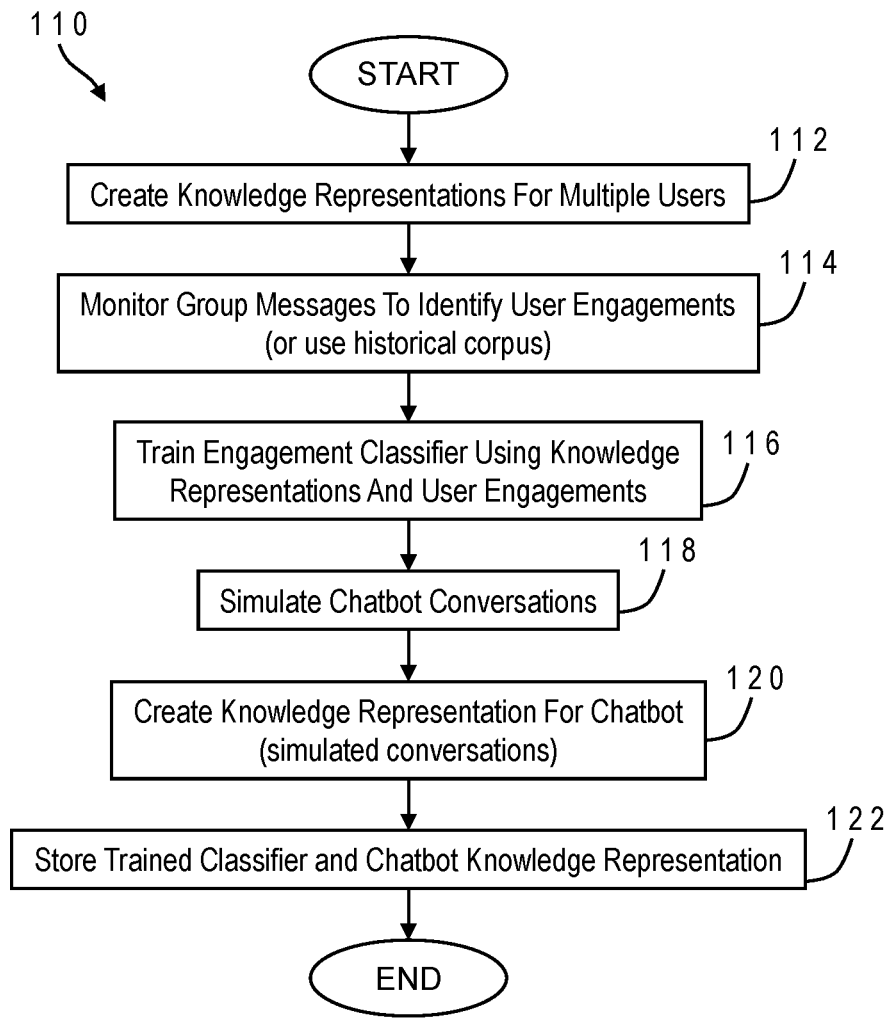
FIG. 4 is a chart illustrating the logical flow for a process of preparing a chatbot classifier and a chatbot knowledge representation at training time in accordance with one implementation of the present invention.

The present invention may be further understood with reference to the chart of FIG. 4 which illustrates the logical flow for a process 110 of preparing the classifier and chatbot knowledge representation in accordance with one implementation of the present invention. Process 110, which may be carried out on a computer system such as computer system 10, begins by creating the knowledge representations for multiple users (112). Group messages are monitored to identify instances of user engagements (114); alternatively, a historical corpus can be used. The engagement classifier is then trained using the user knowledge representations and user engagements (116). Conversations are simulated with the chatbot (118). A knowledge representation is then created for the chatbot (120), preferably using the same knowledge embedding technique employed for the user knowledge representations. The trained classifier and chatbot knowledge representation can be stored for later use (122).

Figure 5:
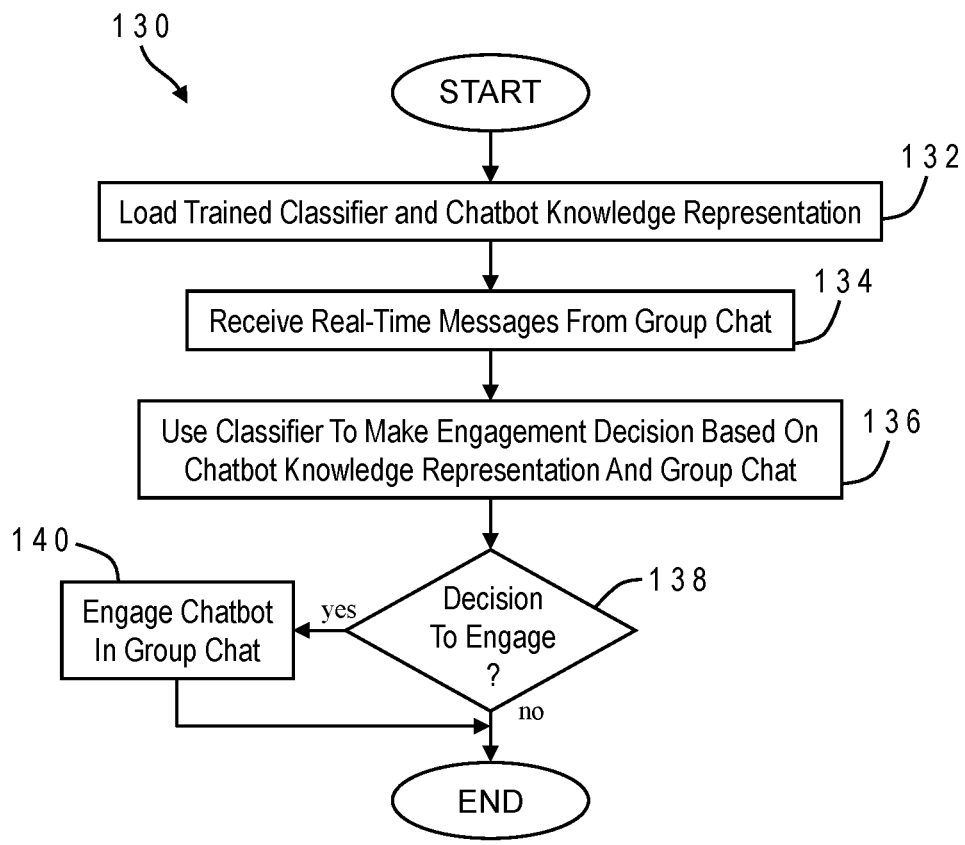
FIG. 5 is a chart illustrating the logical flow for a process of determining whether a chatbot will engage in a group conversation at runtime in accordance with one implementation of the present invention.

FIG. 5 illustrates the subsequent process 130 of determining whether a chatbot will engage in a group conversation at runtime in accordance with one implementation of the present invention. Process 130 is carried out using a computer system, again such as computer system 10. The trained classifier and chatbot knowledge representation are loaded into the computer system (132). Once the chatbot knowledge representation is available along with the trained engagement classifier, real-time messages are continuously fed to the engagement classifier (134), which makes the engagement decision (136). For those cases where the classifier gives a positive indication of engagement (138), the chatbot can proceed with group chatting (140). This process may be repeated continuously during group chatbot operation.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described in the context of group chat messaging which may take place in a chat room, but it is not limited to this specific environment. Rather, it is applicable to any type of group communications including but not limited to texting (Short Message Service), instant messaging, microblogs, transcribed voice communications, etc. It is therefore contemplated that such modifications can be made without departing from the spirit or scope of the present invention as defined in the appended claims.

What is claimed is:

1. A method of enabling an engagement classifier for a group chatbot comprising:

receiving a plurality of direct message conversations for respective users, by executing first instructions in a computer system;

obtaining from each direct message conversation a collection of terms per user, by executing second instructions in the computer system;

creating a knowledge representation for the users based on the collections of terms, by executing third instructions in the computer system;

monitoring group messages to identify instances of user engagements, by executing fourth instructions in the computer system;

training the engagement classifier by correlating the knowledge representations with the instances of user engagements, by executing fifth instructions in the computer system;

creating a knowledge representation for the group chatbot based on another collection of terms derived from simulated conversations of the group chatbot;

receiving real-time group chat different from the group messages;

using the knowledge representation for the group chatbot with the engagement classifier to make a positive decision to engage in the group chat; and responsively engaging the group chatbot with the group chat.

2. The method of claim 1 wherein the user knowledge representation is created by modeling the terms as sparse vectors in a vocabulary space and applying principal component analysis to the sparse vectors resulting in a dense vector corresponding to the knowledge representation.

3. The method of claim 1 wherein the user knowledge representation is created by modeling the users as documents and applying latent Dirichlet allocation to the documents resulting in a topic distribution corresponding to the knowledge representation.

4. The method of claim 1 wherein the engagement classifier is trained using a long short-term memory network which maintains a state of a group conversation based on the group messages.

5. The method of claim 1 wherein the engagement classifier is trained using cosine similarity measurements between a first vector representing a conversation history of the group messages and a second vector representing the knowledge representation.

6. The method of claim 1 wherein the knowledge representation for the users and the knowledge representation for the group chatbot are created using the same knowledge embedding technique.

7. A computer system comprising:
one or more processors which process program instructions;
a memory device connected to said one or more processors; and
program instructions residing in said memory device for enabling an engagement classifier for a group chatbot by receiving a plurality of direct message conversations for respective users, obtaining from each direct message conversation a collection of terms per user, creating a knowledge representation for the users based on the collections of terms, monitoring group messages to identify instances of user engagements, training the engagement classifier by correlating the knowledge representations with the instances of user engagements, creating a knowledge representation for the group chatbot based on another collection of terms derived from simulated conversations of the group chatbot, receiving real-time group chat different from the group messages, using the knowledge representation for the group chatbot with the engagement classifier to make a positive decision to engage in the group chat, and responsively engaging the group chatbot with the group chat.

8. The computer system of claim 7 wherein the user knowledge representation is created by modeling the terms as sparse vectors in a vocabulary space and applying principal component analysis to the sparse vectors resulting in a dense vector corresponding to the knowledge representation.

9. The computer system of claim 7 wherein the user knowledge representation is created by modeling the users as documents and applying latent Dirichlet allocation to the documents resulting in a topic distribution corresponding to the knowledge representation.

10. The computer system of claim 7 wherein the engagement classifier is trained using a long short-term memory network which maintains a state of a group conversation based on the group messages.

11. The computer system of claim 7 wherein the engagement classifier is trained using cosine similarity measurements between a first vector representing a conversation history of the group messages and a second vector representing the knowledge representation.

12. The computer system of claim 7 wherein the knowledge representation for the users and the knowledge representation for the group chatbot are created using the same knowledge embedding technique.

13. A computer program product comprising:
a computer readable storage medium; and
program instructions residing in said storage medium for enabling an engagement classifier for a group chatbot by receiving a plurality of direct message conversations for respective users, obtaining from each direct message conversation a collection of terms per user, creating a knowledge representation for the users based on the collections of terms, monitoring group messages to identify instances of user engagements, training the engagement classifier by correlating the knowledge representations with the instances of user engagements, creating a knowledge representation for the group chatbot based on another collection of terms derived from simulated conversations of the group chatbot, receiving real-time group chat different from the group messages, using the knowledge representation for the group chatbot with the engagement classifier to make a positive decision to engage in the group chat, and responsively engaging the group chatbot with the group chat.

14. The computer program product of claim 13 wherein the knowledge representation for the users and the knowledge representation for the group chatbot are created using the same knowledge embedding technique.

* * * * *